United States Patent

Rengstl et al.

[11] 4,323,277
[45] Apr. 6, 1982

[54] VEHICLE ROOF WITH A CUTOUT TO ACCEPT A COVER AND METHOD FOR ITS MANUFACTURE

[75] Inventors: Johann Rengstl, Munich; Alfons Lutz, Emmering, both of Fed. Rep. of Germany

[73] Assignee: Webasto-Werk W. Baier GmbH & Co., Munich, Fed. Rep. of Germany

[21] Appl. No.: 72,473

[22] Filed: Oct. 17, 1979

[30] Foreign Application Priority Data

Sep. 1, 1978 [DE] Fed. Rep. of Germany ... 7825982[U]

[51] Int. Cl.³ ............................................. B60J 7/00
[52] U.S. Cl. ..................................... 296/216; 49/490
[58] Field of Search ............... 296/216, 218, 222, 93; 49/463, 466, 490, 491, 497, 498

[56] References Cited

U.S. PATENT DOCUMENTS

| | | | |
|---|---|---|---|
| 3,793,772 | 2/1974 | Kouth | 49/490 |
| 3,974,753 | 8/1976 | Blomgren | 296/218 |
| 3,982,783 | 9/1976 | Vermeulen | 296/216 |
| 4,114,320 | 9/1978 | Pullan | 49/491 |
| 4,127,302 | 11/1978 | Green | 296/218 |
| 4,133,576 | 1/1979 | Chrysler | 296/218 |
| 4,193,628 | 3/1980 | Sorensen | 296/218 |

*Primary Examiner*—Joseph F. Peters, Jr.
*Assistant Examiner*—John A. Carroll
*Attorney, Agent, or Firm*—Craig and Antonelli

[57] ABSTRACT

A vehicle roof with a cutout to accept a cover and a method for its manufacture including, according to a preferred embodiment, the use of a rubber gasket surrounding an edge of the body panel so as to cover attachment elements securing a frame of angular cross-section with an adjoining body panel defining the cutouts. The gasket includes, according to preferred arrangements, teeth for securely retaining the gasket upon the edge of the body panel and flocking and/or an air chamber to enable sealing engagement with the removable cover.

7 Claims, 3 Drawing Figures

VEHICLE ROOF WITH A CUTOUT TO ACCEPT A COVER AND METHOD FOR ITS MANUFACTURE

BACKGROUND AND SUMMARY OF THE INVENTION

The invention relates to a vehicle with a cutout to accept a swivelable and/or slidable cover, and with a frame fastened to the vehicle roof and surrounding the cutout.

Tilting and/or sliding roofs with rigid covers are presently available as factory and custom installations. The installation process involves bending the edge of the cutout around and down before painting, and fastening it to the side wall of the frame. If such a tilting and/or sliding roof is to be retrofitted, this type of mounting of the frame to the vehicle roof means that the paint flakes off at the point where the edge of the cutout is bent downward, necessitating repainting of the roof. In addition, bending over the edge of the cutout is a work-intensive process.

The goal of the invention is to manufacture a vehicle roof of the type described hereinabove wherein subsequent installation of a tilting and/or sliding roof with a mass-produced frame is made possible in a simple manner and especially without the need for shaping and painting work on the vehicle roof.

This goal is achieved according to the invention by the fact that the edge of the cutout projects inward away from the edge of the frame, by the fact that the edge of the frame is bent over outward and connected to the roof, and by the fact that a rubber gasket is provided, said gasket fitting around the edge of the cutout and covering the point at which the frame is fastened to the exterior of the vehicle roof, said gasket being designed as a sealing element in its area which fits around the edge of the cutout, or carrying a sealing element, to provide a seal for the cover when the latter is in the closed position.

In the arrangement proposed according to the invention, retrofitting of such a tilting and/or sliding roof merely requires that an appropriate cutout be provided in the vehicle, connecting the edge of the frame to the vehicle roof by screws or rivets, and fitting the rubber gasket to the edge of the cutout. The fact that the rubber gasket simultaneously serves as a seal around the cover makes it unnecessary to provide a seal on the edge of the cover, as would otherwise be required.

The seal can be provided in a known fashion by flocking or providing an air chamber in the rubber gasket.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
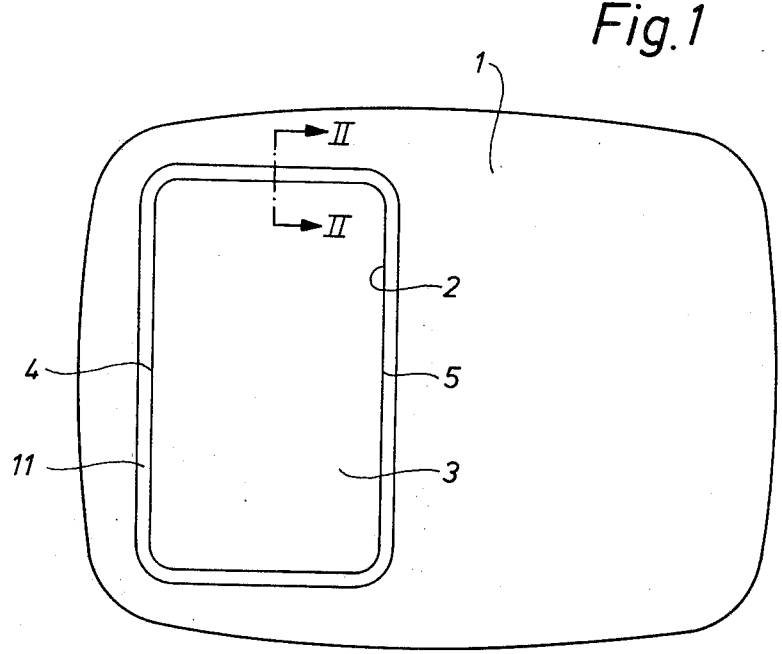
FIG. 1 is a top view of a vehicle roof.

In FIG. 1, the vehicle roof is designated 1, said roof having a roof cutout 2, into which cutout, in the embodiment shown, a rigid cover 3 made of glass, plastic, or metal is inserted, said cover being swivelable near its forward edge 4 and having a rear edge 5 tiltable by a mechanism not shown.

Roof cutout 2 is surrounded by a frame 6, said frame essentially having a vertical wall 7, from whose upper border an edge 8 extends outward approximately parallel to vehicle roof 1. Edge 9 of roof cutout 2 extends inward from the vertical wall 7 of frame 6. Edge 8 of frame 6, in the illustrated embodiment, is connected with roof 1 by self-sealing coated blind rivets 10. A rubber gasket 11 fits around edge 9 of roof cutout 2 and is provided with a lip 12, which covers rivets 10 and rests on vehicle roof 1 under tension. A metal strip 13, U-shaped in cross section, is imbedded in gasket 11 to attach rubber gasket 11 to edge 9, said strip having teeth 14 which bite into edge 9. The area of rubber gasket 11 which surrounds edge 9 is designed on the outside as a sealing element, which comes into sealing contact with the edge of cover 3, when said cover is in the closed position. This seal can be formed of flocking 15 made of PVC or polyamide fibers approximately 2–3 mm long, of a known design, said flocking being glued to rubber gasket 11. For improved holding of sealing element 15, rubber gasket 11 can be provided with a recess 16 in which sealing element 15 is inserted.

In order to reliably prevent the leakage of water into the interior, a flat seal 17 can be provided between edge 8 of frame 6 and vehicle roof 1, said seal simultaneously serving as a height adjustment, since frame 6 is so disposed in mass-produced installations that edge 8 comes to rest at a distance from vehicle roof 1 which corresponds to the thickness of seal 17.

Figure 2:
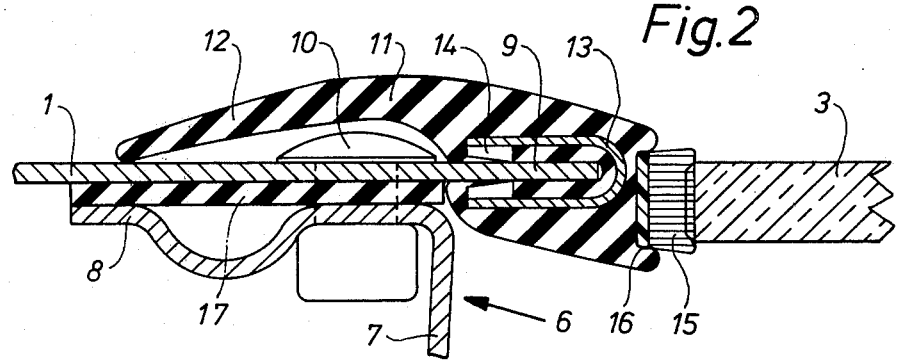
FIG. 2 is a section along line II-II in FIG. 1 on an enlarged scale.
Figure 3:
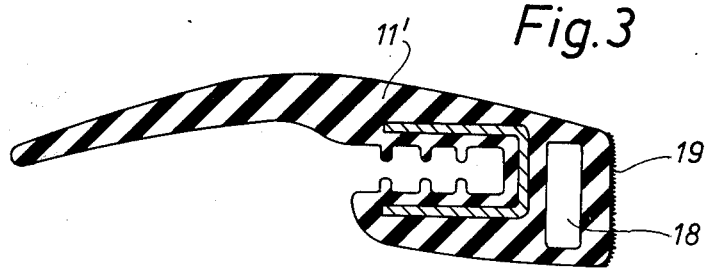
FIG. 3 is a section through a rubber gasket in another embodiment.

FIG. 3 shows another design for the rubber gasket which is designated 11'. In gasket 11' an air chamber 18 is provided in the sealing area, said chamber being more or less compressed when cover 3 is closed causing the outer surface 19 or rubber gasket 11' to rest in a sealing manner against the circumferential edge of cover 3. This suface 19 can also be provided with short flocking. Additionally, the gripping teeth 14 of the FIG. 2 embodiment are replaced by teeth-like gripping projections formed unitarily as part of the gasket itself.

From the foregoing it should be apparent that the gasket and frame construction according to the present invention enables retrofitting of a vehicle roof or other body panel member with a moveable cover assembly in a simple manner without the need for shaping or painting of the vehicle body panel. That is, an appropriate shape cutout is formed, for example, in the roof of the vehicle, the edge of frame 6 is then connected to the roof panel by screws or rivets, and rubber gasket 11 or 11' fit onto the edge of the cutout. Since the gasket covers the cutout edge and frame fasteners, no painting or shaping is required, and the gasket additionally eliminates the need for a seal on the edge of the cover.

While we have shown and described several embodiments in accordance with the present invention it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Vehicle body panel assembly comprising a vehicle body panel having a cutout for receiving a movable cover, a frame fastened to an underside of the vehicle body panel by fasteners and surrounding the cutout at a position located outwardly from an edge of said body panel defining the cutout, said frame being of an angular cross-section with an edge of the frame adjoining the body panel, and a rubber gasket, said gasket surrounding the edge of the body panel so as to cover the fasteners on an outer side of the vehicle body panel, and being constructed for providing a leak-proof sealing of the cutout by engaging a cover when the latter is in a position closing said cutout.

2. Vehicle body panel assembly according to claim 1, comprising a flocking provided on said rubber gasket for providing said sealing engagement.

3. Vehicle body panel assembly according to claims 1 or 2, characterized by the fact that the rubber gasket is provided with an air chamber in an area of the gasket which provides said sealing engagement.

4. Vehicle panel assembly according to claims 1 or 2, wherein said gasket is provided with teeth and an embedded U-shaped strip for causing said gasket to be securely retained upon the edge of the body panel.

5. Vehicle body panel assembly according to claim 1, wherein said fasteners extending from the outside of said body panel through said body panel and frame edge, and wherein the gasket is provided with a lip that overlies the fasteners on the outside of the body panel.

6. Vehicle body panel assembly according to claim 5, wherein a flat seal member is interposed between the body panel and the edge of the frame.

7. A method for retrofitting a vehicle body panel with a movable cover comprising the steps of:
   (a) forming a cutout in a vehicle body panel;
   (b) attaching an edge of a frame to an underside of the body panel by fasteners with the frame surrounding the cutout at a position spaced outwardly relative to an edge of the body panel defining the cutout; and
   (c) fitting a gasket upon the edge of the body panel so as to surround the edge of the body panel and cover the fasteners attaching said frame edge to said body panel as well as forming a leak-proof seal for said cutout when a cover is in a position closing said cutout.

* * * * *